United States Patent [19]

Moran

[11] Patent Number: 4,609,775

[45] Date of Patent: Sep. 2, 1986

[54] BUSHING INCLUDING AN EXPANSION COMPENSATION SEAL

[75] Inventor: John H. Moran, Stafford, N.Y.

[73] Assignee: Interpace Corporation, Purchase, N.Y.

[21] Appl. No.: 636,370

[22] Filed: Jul. 31, 1984

Related U.S. Application Data

[63] Continuation-in-part of Ser. No. 387,823, Jun. 14, 1982, abandoned.

[51] Int. Cl.⁴ ........................ H01B 17/30; F16J 15/12

[52] U.S. Cl. ............................ 174/152 R; 174/31 R; 277/180; 277/184; 277/233; 277/235 R

[58] Field of Search ........ 174/11 BH, 12 BH, 14 BH, 174/15 BH, 16 BH, 18, 31 R, 31.5, 75 R, 75 D, 75 F, 77 R, 142, 143, 152 R, 153 R, 167; 277/125, 180, 181, 182, 184, 188 R, 188 A, 227, 233, 234, 235 R; 285/DIG. 11

[56] References Cited

U.S. PATENT DOCUMENTS

| | | | |
|---|---|---|---|
| 524,162 | 8/1894 | Cochrane | 277/233 |
| 1,752,281 | 3/1930 | Austin | 174/31 R X |
| 2,802,176 | 8/1957 | Anderson et al. | 174/143 X |
| 2,852,291 | 9/1958 | Hults | 277/235 X |
| 3,278,883 | 10/1966 | Lipsey | 174/78 X |

FOREIGN PATENT DOCUMENTS

| | | | |
|---|---|---|---|
| 1002996 | 2/1957 | Fed. Rep. of Germany | 277/233 |
| 2550289 | 5/1976 | Fed. Rep. of Germany | 277/233 |

*Primary Examiner*—Laramie E. Askin
*Attorney, Agent, or Firm*—Charles E. Baxley

[57] ABSTRACT

This invention is directed to an improved seal for an electrical conductor bushing operable in service above about 69 kV. Typically, the seal is interposed between the bushing cap and the porcelain. Two flat, thin non-metallic gaskets are stacked together and separated from each other by means of a rigid washer. The rigid washer is provided with a pair of inner and outer up-standing flanges which form a trough for engagement therein of one of the gaskets. The gasket-washer assembly provides oil-tight integrity for the bushing under standard industry cantilever and thermal expansion tests.

6 Claims, 3 Drawing Figures

BUSHING INCLUDING AN EXPANSION COMPENSATION SEAL

This application is a continuation-in-part application based on an original application having Ser. No. 387,823 filed on Jun. 14, 1982 and now abandoned.

This invention relates to seals that compensate for thermal expansion and contraction and, more particularly, to a pair of relatively thin gaskets separated by a rigid spacer for establishing an oil-tight seal in a bushing for a transformer, circuit breaker or the like.

As the design rating for electrical power transmission conductors exceeds about 69 kilovolts (kV) a number of hitherto minor physical effects assume dimensions of dominant problems. In a bushing the temperature gradient along the radius of the bushing, as it varies from the central, hot, current-carrying conductor to the relatively cold outer surface of the bushing, produces a differential expansion between inside and outside that causes leaks through which insulating oil seeps. This insulating oil leakage is typical of the problems that are aggravated by these high voltage ratings.

Illustratively, for high voltage service, a typical bushing often has one or more porcelain insulators that enclose the conductor. At least one of the porcelain insulators also abuts a metal flange. Frequently only oil, or oil in combination with some other material, is used to insulate electrically the central conductor from the outer bushing structure. It is, of course, quite important when installing these bushings to establish leak-tight seals between the porcelains and the flange to prevent the insulating oil from leaking out of the bushing. During operation, however, the central conductor becomes quite hot from the current that it is carrying. This heat causes the central portion of the bushing to expand at the same time that the outer surface of the bushing, being exposed to the atmosphere, undergoes little or no thermal expansion. These differences in bushing thermal expansion and contraction through the range of anticipated service conditions tend to degrade the oil-tight integrity of the bushing.

To cope with this leakage problem, it has been the practice to place a spring biased assembly at one end of the bushing in order to accommodate the progressive changes in length from the bushing center to its surface that is caused by this temperature gradient. Appropriately chosen springs will maintain the required degree of compression between the seals and the balance of the bushing structure. This spring assembly, however, is elaborate and expensive.

There have been other proposals in the prior art to cope with this problem. The following patents are typical of these prior art suggestions.

U.S. Pat. No. 1,572,404 granted to R. D. Mershon for "Protecting Condenser Parts Against Corrosion" shows an insulating tube enclosing a lead that is coiled to form a contractile spring.

U.S. Pat. No. 1,726,096 granted Aug. 27, 1929 to A. O. Austin for "Means For Supporting Baffles In Oil Filled Bushings" shows a gasket clamped between two dielectric members in which the gasket contains a centrally disposed metallic member.

U.S. Pat. No. 1,752,281 granted Mar. 25, 1930 to A. O. Austin for "Insulator Bushing Joint" shows a gasket clamped between two complementary dielectric shells.

U.S. Pat. No. 1,788,380 granted Jan. 13, 1931 to G. A. Burnham for "Insulating Bushing" shows a packing washer interposed between a ring and a casing wall to provide a fluid tight bushing seal.

U.S. Pat. No. 3,278,883 granted Oct. 11, 1966 to G. F. Lipsey for "Combined Gasket and Grounding Device For Bushings" shows two ring-shaped gasket members that sandwich an electrically conductive ring-shaped disk.

U.S. Pat. No. 3,504,106 granted Mar. 31, 1970 to A. I. Keto for "Electrical Bushings" shows a thermoplastic coated metallic mounting ring member.

U.S. Pat. No. 3,760,089 granted Sept. 18, 1973 to J. L. Hildenbrand et al. for "Electrical Bushing Assembly Having Resilient Means Enclosed Within Sealing Means" shows coil springs for relieving mechanical stress in a high-voltage bushing.

U.S. Pat. No. 3,962,667 granted June 8, 1976 To E. A. Link for "Combination Fuse And Bushing" shows a cap and threaded terminal that seals a housing by means of a gasket.

U.S. Pat. No. 4,166,194 granted Aug. 28, 1979 to P. C. Bolin for "Gas-Insulated Bushing With Self-Adjusting Bushing Flange Seal" shows sealing rings seated in respective grooves that have been formed in a portion of the seal holder.

None of these proposals, however, suggests a simple and inexpensive seal that will maintain the oil-tight integrity of an electrical conductor bushing in spite of a pronounced thermal expansion gradient of the busing relative to its radius.

The foregoing problem is solved, to a great extent, through the practice of the present invention. Typically, a pair of relatively thin non-metallic gaskets disposed on opposite sides of a washer or spacer enjoy sufficient inherent resiliency to compensate for these undesirable but inherent thermal expansion effects that otherwise would tend to destroy the oil-tight integrity of the bushing.

For bushings rated about 69 kV and below it has been known through practice that a ¼" thick gasket of ordinary nonmetallic gasket material, such as a mixture of rubber and cork, when properly compressed, has sufficient resiliency to accommodate the differential change in length between the inner conductor and the outer members of the bushing assembly without destroying the required seal. However, in the overall lengths required for voltage ratings above about 69 kV, the single ¼" thick gasket is not adequate. It has been further learned that substitution of a ½" thick gasket for use at these higher voltage ratings is unsatisfactory, the thicker gaskets failing for some reason to provide a mechanical response that will maintain the oil-tight nature of the bushing seal.

I have now found, however, that two ¼" thick gaskets separated by a rigid spacer provide the desired seal integrity at these higher duty ratings. It would seem in these circumstances that the two, thinner gaskets behave independently of each other in adjusting to the effects of the different thermal expansions that are encountered in the normal range of bushing operation and are superior in combination to the effect gained by one thick gasket.

For a more complete appreciation of the invention, attention is invited to the following detailed description of a preferred embodiment of the invention, when taken with the accompanying drawing. The scope of the invention, however, is limited only through the claims.

DETAILED DESCRIPTION OF THE PREFERRED EMBODIMENTS

Figure 1:
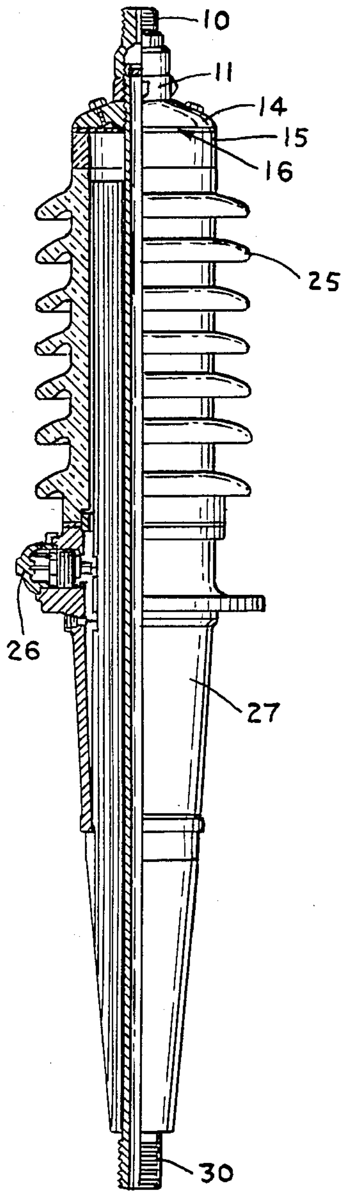
FIG. 1 is a front elevation, in half section, of a bushing that embodies principles of the invention.

For a more detailed understanding of the invention, refernce is made to FIG. 1 which shows an insulating oil-filled bushing suitable for use with electrical conductors that have a voltage rating higher than about 69 kV. The bushing has a threaded terminal 10 that is seated on a generally cylindrical collar 11. As shown, the terminal 10 and the collar 11 are aligned with a longitudinal bushing axis. The terminal 10 and the collar 11 bear against a disk-like cap 14. A hollow cylindrical sight glass or tank wall 15, also in axial alignment with the terminal 10, collar 11 and cap 14, is spaced from the adjacent transverse surface of the cap 14 by means of an annular seal 16. Alternatively, the seal 16 may be placed between other adjacent members such as between sight glass 15 and porcelain 25 or between porcelain 25 and flange 27.

Figure 3:
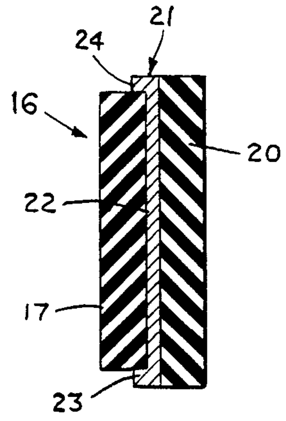
FIG. 3 is a sectional view, taken along the line 3—3 in FIG. 2, showing a pair of gaskets of the seal of FIG. 2 spaced apart by the spacer of FIG. 2.
Figure 2:
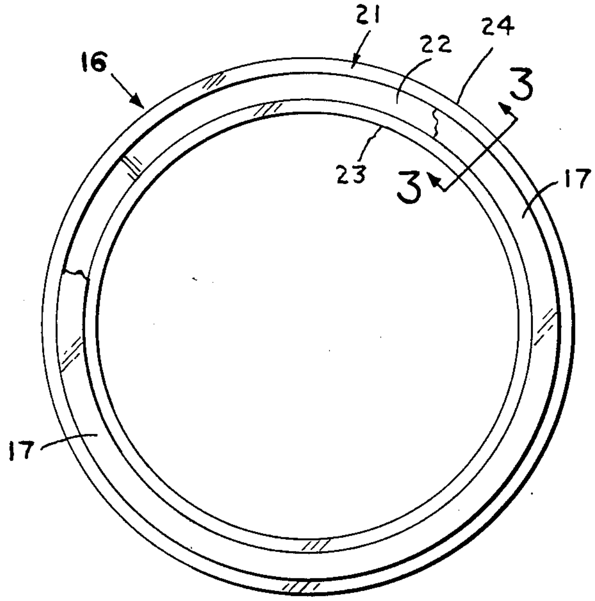
FIG. 2 is a plan view of a seal used in the construction of the bushing of FIG. 1, a portion of the seal being cut away to show an annular spacer having upstanding flanges thereon and being positioned between a pair of gaskets.

In accordance with a salient feature of the invention, the specific details of the seal 16 are best illustrated in FIGS. 2 and 3. As shown, the seal 16 comprises a pair of stacked, flat non-metallic gaskets 17 and 20. In a typical installation for the bushing of FIG. 1 constructed for a voltage rating higher than approximately 69 kV, each of the gaskets 17 and 20 has a flat annular shape with a thickness of approximately $\frac{1}{4}$ inch. The two gaskets 17 and 20 are spaced apart by a thin rigid spacer or washer 21 of substantially constant wall thickness. Spacer 21 is typically of metal or plastic. The spacer 21 is formed as a flat annular ring with a base portion and preferably with upstanding lips or flanges 23 and 24 disposed circumferentially around the inner and outer circumferences of the annular ring. The flanges 23 and 24 protrude only from one side of the base portion of the spacer 21 in order to form a shallow trough 22 on one side of the spacer 21. Gasket 17 perferably should be of a diameter which will fit snugly between flanges 23 and 24. Gasket 20 engages the other side of the base portion and in its unstressed state is coextensive with the base portion. Upon implacement of the seal 16 in the bushing of FIG. 1, a gasket cement should be applied to the seal 16 for best results in the sealing of the bushing.

Returning to FIG. 1, the balance of the bushing comprises, in alignment with the axis, a porcelain 25, a cover spring and potential tap assembly 26, a flange 27 of metal and a terminal 30.

In operation, the bushing shown in FIG. 1 is assembled and the seal 16 is coated with a gasket cement and tightened to a suitable degree of compression. Actual tests have demonstrated that bushings of the type under consideration will not leak insulating oil when subjected to a standard industry cantilever test or under thermal expansion conditions.

Thus, there is provided a simple and inexpensive combination of gaskets and a washer that will maintain the oil tight integrity of an electrical conductor bushing at high voltages. Further in this respect, it is possible to stack together more than two of the thin gasket-washer combinations under consideration to produce a desired sealing result.

It is to be understood that the above-described embodiment of the invention is illustrative only, and that modification thereof may occur to those skilled in the art. Accordingly, this invention is not to be regarded as limited to the embodiment disclosed herein, but is to be limited only as defined by the appended claims.

I claim:

1. A high voltage insulator bushing for service in excess of 69 kV and having axially aligned members arranged for containing insulating oil, and a seal providing a joint between first and second axially adjacent ones of said members, said seal comprising a rigid annular spacer of substantially constant wall thickness and having a flat base portion including first and second surfaces and radially inner and outer circumferentially continuous flanges upstanding from the first surface of the base portion and forming a trough therebetween, a first non-metallic resilient annular gasket seated in said trough and engaging said flanges and the first surface of the base portion and extending axially beyond said flanges, and a second non-metallic resilient annular gasket engaging the second surface of the base portion, and said seal being under axial compression applied by said first and second members to said first and second gaskets.

2. The insulator bushing of claim 1 wherein the spacer is metal.

3. The insulator bushing of claim 1 wherein the spacer is rigid plastic.

4. In a high voltage insulator bushing for service in excess of about 69 kV and having axially aligned members arranged for containing insulating oil; a seal providing a joint between first and second axially adjacent ones of said members and comprising:

a rigid annular spacer of substantially constant wall thickness and having a flat base portion including first and second surfaces and radially inner and outer circumferentially continuous flanges upstanding from the first surface of the base portion and forming a trough therebetween;

a first non-metallic resilient annular gasket seated in said trough and engaging said flanges and the first surface of the base portion; and a second non-metallic resilient annular gasket engaging the second surface of the base portion, and when unstressed being coextensive with the second surface of the base portion, said seal being under axial compression applied by said first and second members to said first and second gaskets.

5. The combination of claim 4 wherein the spacer is metal.

6. The combination of claim 4 wherein the spacer is plastic.

* * * * *